A. G. REYNOLDS.
CAROUSEL.
APPLICATION FILED MAR. 7, 1910.
974,599.
Patented Nov. 1, 1910.
5 SHEETS—SHEET 1.
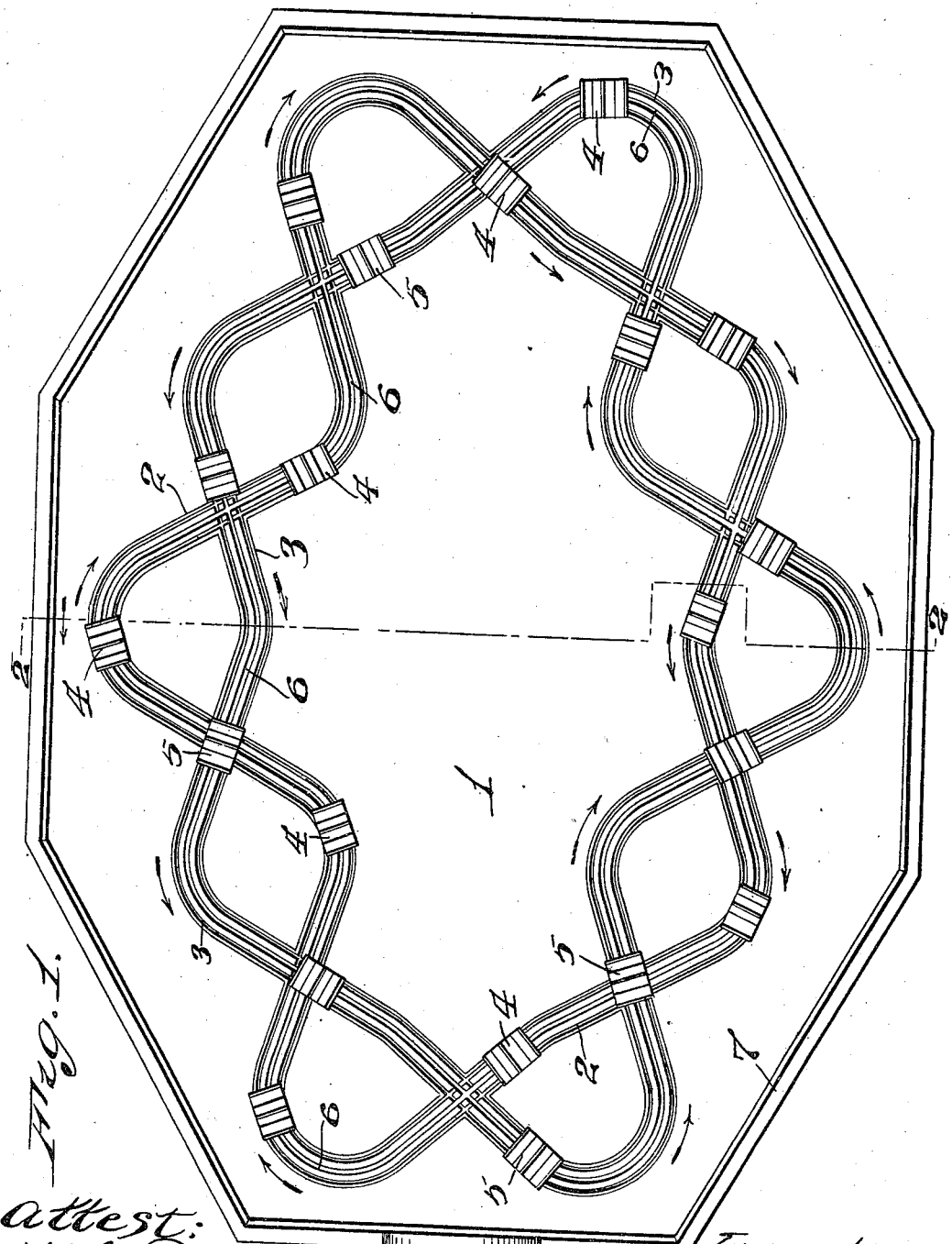

A. G. REYNOLDS.
CAROUSEL.
APPLICATION FILED MAR. 7, 1910.
974,599.
Patented Nov. 1, 1910.
5 SHEETS—SHEET 2.
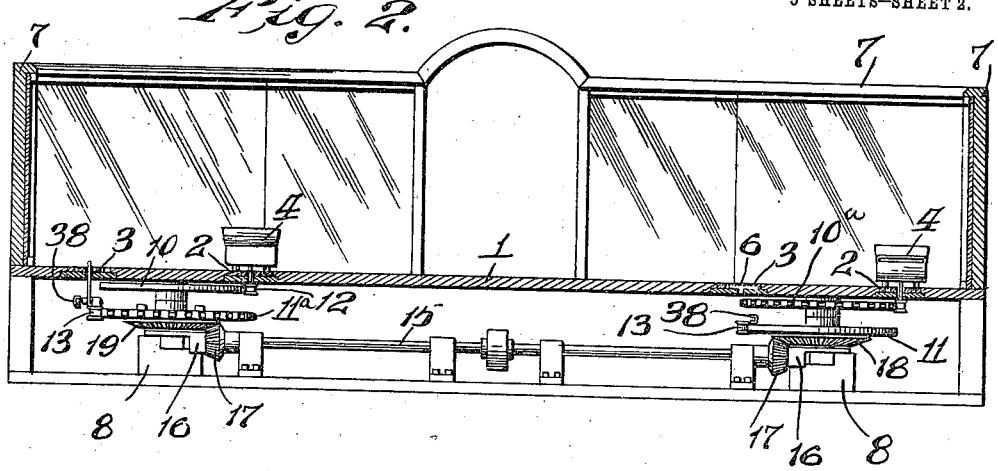
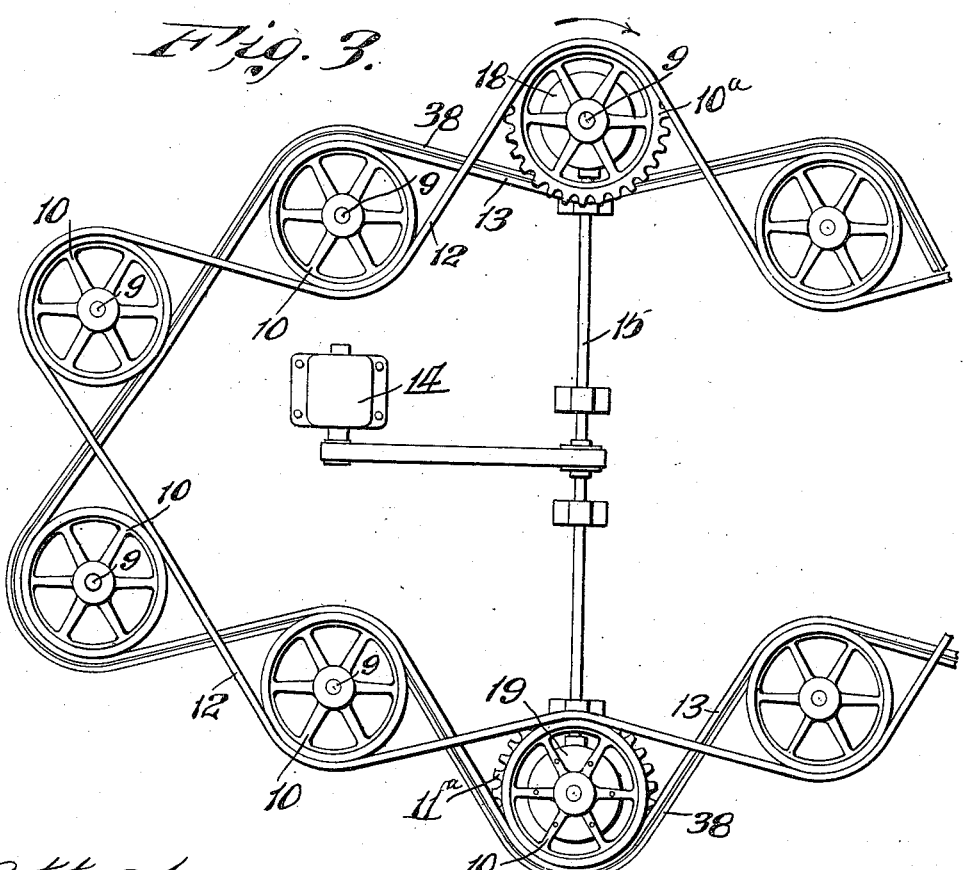
Inventor:
Afton G. Reynolds
By Higdon Longan
attys.
Attest:
H. G. Fletcher
E. L. Wallace A. G. REYNOLDS.
CAROUSEL.
APPLICATION FILED MAR. 7, 1910.
974,599.
Patented Nov. 1, 1910.
5 SHEETS—SHEET 3.
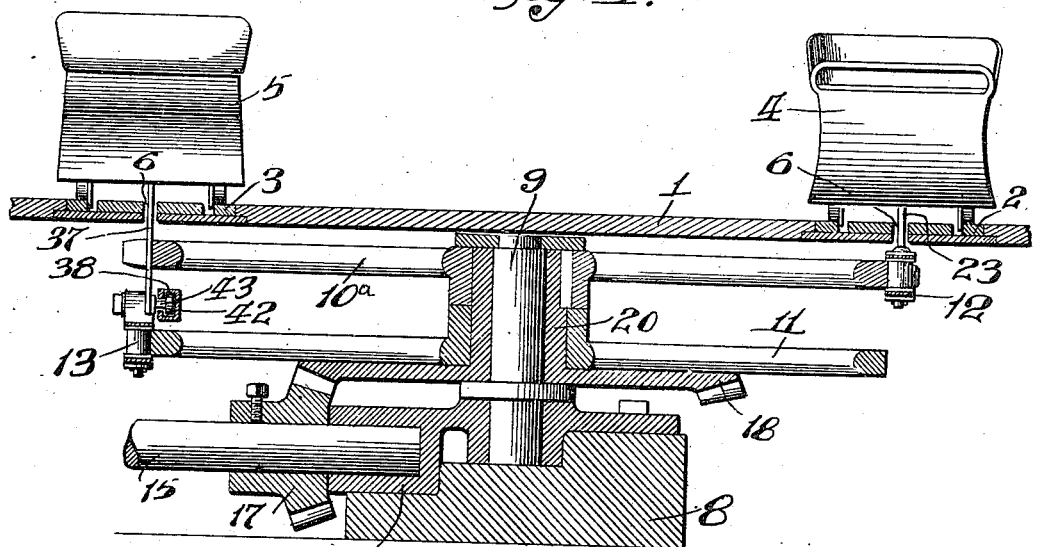
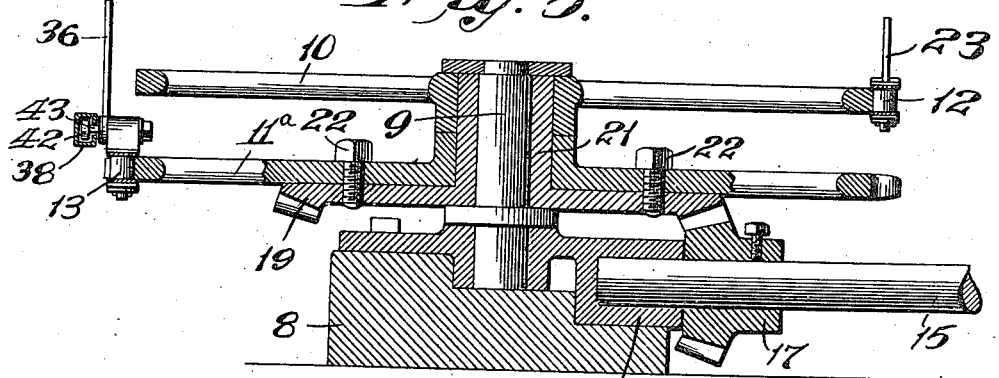
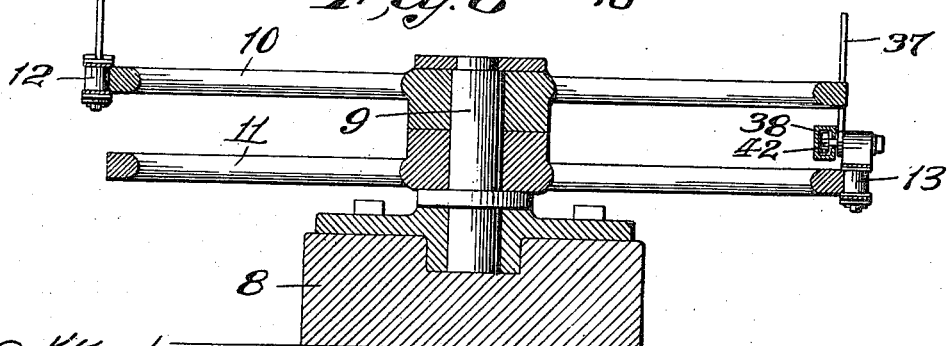

A. G. REYNOLDS.
CAROUSEL.
APPLICATION FILED MAR. 7, 1910.

974,599.

Patented Nov. 1, 1910.
5 SHEETS—SHEET 4.

attest:
H. G. Fletcher
E. L. Wallace

Inventor:
Axton G. Reynolds
By Higdon & Longan
attys.

A. G. REYNOLDS.
CAROUSEL.
APPLICATION FILED MAR. 7, 1910.

974,599.

Patented Nov. 1, 1910.
5 SHEETS—SHEET 5.

Attest:
H. G. Fletcher
E. L. Wallace

Inventor:
Afton G. Reynolds
By Higdon Longan
attys.

THE NORRIS PETERS CO., WASHINGTON, D. C.

UNITED STATES PATENT OFFICE.

AFTON G. REYNOLDS, OF ST. LOUIS, MISSOURI, ASSIGNOR TO AMUSEMENT PARK RAILWAY CO., OF ST. LOUIS, MISSOURI, A CORPORATION OF ARIZONA TERRITORY.

CAROUSEL.

974,599.   Specification of Letters Patent.   Patented Nov. 1, 1910.

Application filed March 7, 1910. Serial No. 547,834.

*To all whom it may concern:*

Be it known that I, AFTON G. REYNOLDS, a citizen of the United States, and resident of St. Louis, Missouri, have invented certain new and useful Improvements in Carousels, of which the following is a specification containing a full, clear, and exact description, reference being had to the accompanying drawings, forming a part hereof.

This invention relates to improvements in carousels in which there are continuous track ways crossing each other at intervals and a pair of oppositely driven chains paralleling the track ways and situated beneath the track ways and more particularly to the means for driving the chains and the means for releasing the passenger-carrying trucks from the chains at the points of crossing.

The object of my invention is to construct the means for driving the chains and the means for disengaging the chains from the passenger-carrying trucks at points of crossing in such manner to produce a more uniform speed of travel of the passenger carrying devices and to construct the means for supporting the driving chains in such manner as to materially reduce the friction between the chain and the driving means and between the supports, chain-directing means and their bearings.

Figure 7:
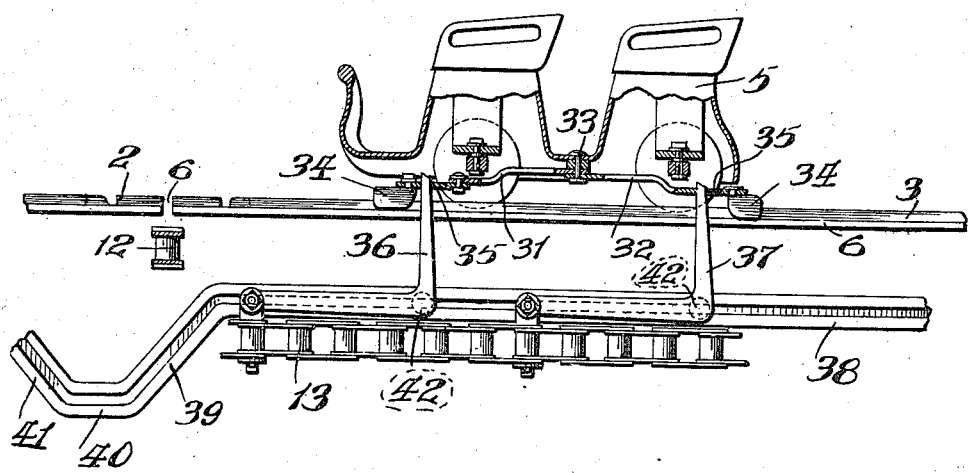
Figure 8:
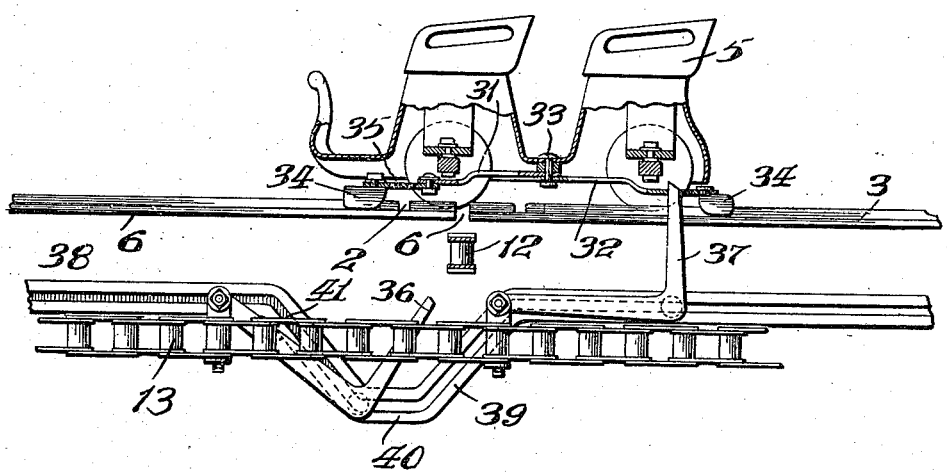
Figure 9:
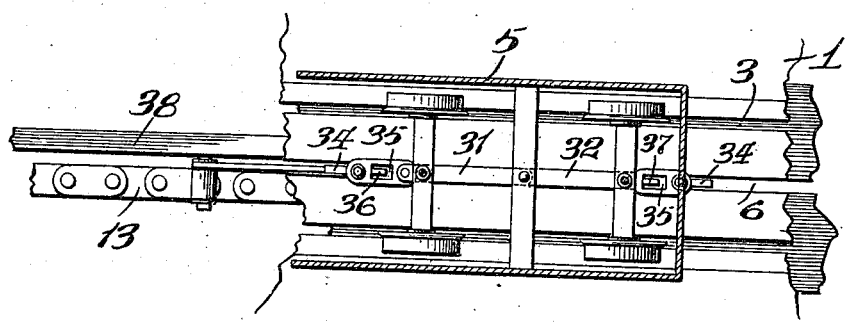
Figure 10:
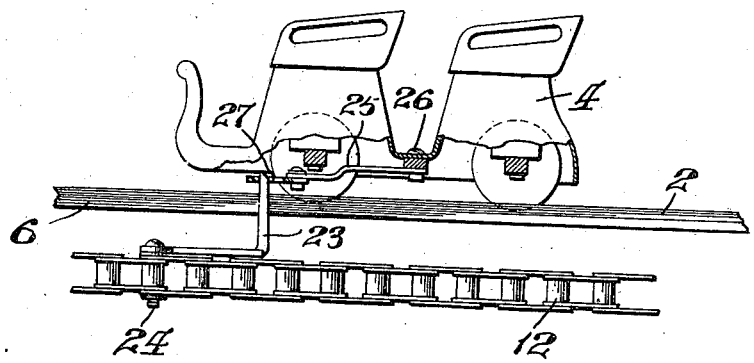
Figure 11:
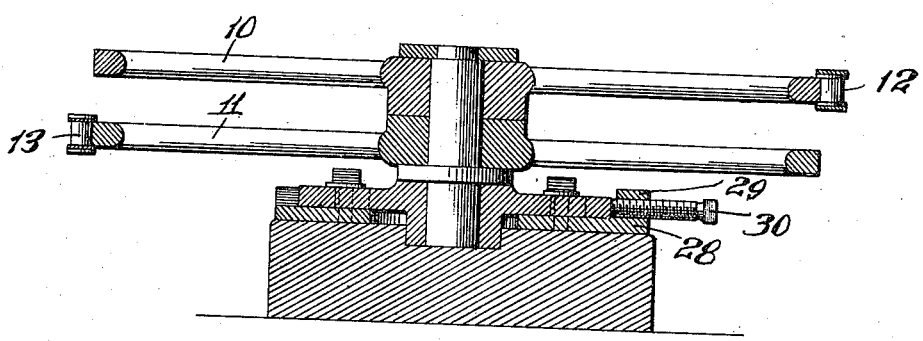

For the above purposes my invention consists in certain novel features of construction and arrangement of parts as will be hereinafter more fully described, pointed out in the claims and illustrated by the accompanying drawings, in which:

Figure 1 is a plan of the complete carousel showing the paths of travel of the various passenger-carrying trucks with a series of trucks thereon; Fig. 2 is a transverse, sectional elevation of the carousel taken on the line 2—2 of Fig. 1; Fig. 3 is a plan showing one end portion of each of the driving chains and the means for driving and directing the chains; Fig. 4 is an enlarged, detail, sectional elevation of the means for driving the upper chain and supporting an idler for directing the lower chain; Fig. 5 is a view similar to Fig. 4 showing the means for driving the lower chain and supporting an idler for directing the upper chain; Fig. 6 is an enlarged, sectional elevation illustrating one of the means whereby the upper and lower chains are supported by idlers carried by a common support; Fig. 7 is an elevation illustrating the means whereby the truck is driven by the chain, portions of the truck being in section; Fig. 8 is a view similar to Fig. 7 showing the forward truck-engaging device out of engagement with the truck during the time of passage over a crossing; Fig. 9 is an enlarged plan illustrating the relative arrangements of the track way, the drive chain, a portion of a truck and the means carried by the lower drive chain for engagement with the truck; Fig. 10 is an elevation similar to Figs. 7 and 8 and shows the means carried by the upper drive chain for engaging one of the trucks; and Fig. 11 is a view similar to Fig. 6 and illustrates a means for compensating for the stretching or shrinking of the drive chains.

Referring by numerals to the accompanying drawings: 1 designates the platform and 2 and 3 designate sinuous or tortuous track ways crossing each other at intervals and supported by the platform.

Arranged for travel on the track way 2 is a number of trucks 4 and arranged for travel upon the track way 3 is a number of trucks 5.

Each track way is provided with a slot 6 throughout its length.

7 designates an inclosing wall, the inside face of which is provided with a reflecting surface. As shown the inclosing wall is octagonal, the reflecting surfaces of which present to the passengers, carried by the trucks, a pleasing, scenic effect caused by the reflection of the moving trucks and their passengers.

Arranged beneath the platform is a series of bearing blocks 8 and carried by each block is a vertically disposed shaft 9, and carried by each of the shafts 9 is a pair of directing wheels 10 and 11. Supported by and in engagement with each of the wheels 10 and 11 is a pair of continuous drive chains 12 and 13 supported in different horizontal planes.

The wheels 10$^a$ and 11$^a$, of the series, located at the longitudinal center of the carousel, are the drive wheels and are arranged to be driven simultaneously by the motor 14.

Located adjacent the motor 14, and on a line between the driving wheels, is a shaft 15 which is of a length sufficient to extend the full width of the carousel and terminate at points under the wheels 10ª and 11ª at opposite sides of the carousel, the ends of which shaft 15 are supported in bearings 16 carried by the bearing blocks 8.

Arranged adjacent each end of the driving shaft 15 is a beveled gear wheel 17 arranged to engage respectively with a beveled gear wheel 18 for driving the upper chain 12 and with a beveled gear wheel 19 for driving the lower chain 13.

As shown in Fig. 4 of the drawing, the beveled gear wheel 17 engages the beveled gear wheel 18 which is an integral part of a sleeve 20 embracing the upright shaft 9 and to which is keyed the wheel 10ª, the wheel 11 operating loosely about the sleeve 20.

In the construction shown in Fig. 5 the gear wheel 17 engages the gear wheel 19 which is secured to the wheel 11ª for driving the lower chain. In this construction, the gear wheel 19 is provided with a sleeve 21 and the wheel 10, which is an idler in this case, loosely operates about the sleeve 21 and the wheel 11ª, for driving the lower chain, is secured to and rotates with the gear wheel 19 by means of the cap screws 22.

The chain 12, or upper chain, is provided with a series of vertically disposed fingers 23 which are pivotally connected to the chain by means of the pivot 24. The fingers 23 are arranged at regular intervals throughout the length of the chain, that is they are spaced equi-distant apart on the chain.

Each of the trucks 4 is provided with a draw-bar 25 which is pivotally carried by the bolt 26. The forward end of which draw-bar 25 is provided with an eye 27 into which the finger 23 projects and by which means the truck is moved on the track way 2. In this manner when motion is imparted to the shaft 15 each of the trucks 4 is driven over the track way 2 in the same direction and at an equi-distance of separation.

To provide for the adjustment of the chains 12 and 13, to take up shrinkage or stretching of the chains, one of the bearing blocks 8, preferably one adjacent one of the ends of the carousel, is provided with a cap plate 28 having an internally threaded, upwardly extending flange 29 through which is seated a set screw 30 arranged for engagement with a portion of the means for supporting and maintaining the upright shaft 9. By a manipulation of the set screw 30 the entire shaft and both of the wheels 10 and 11 are moved in a direction desired to take up or loosen the drive chains.

Each of the trucks 5 is provided with a pair of draw-bars 31 and 32 which are pivotally secured to the truck by the bolts 33 and, arranged adjacent each free end of the draw-bars 31 and 32 is a shoe 34 the function of which is to normally hold the free ends of the draw-bars in a position over the slot 6 formed in the track way, the shoes being arranged to project into and travel through the slot. Each of the draw-bars is provided with an eye 35.

Carried by the lower chain 13 is a pair of bell-crank levers 36 and 37, the forward ends of which are pivotally mounted on the chain 13. The ends of the bell-crank levers, opposed to the ends secured to the chain 13, are arranged for engagement with the eyes 35 in the draw-bars.

Arranged adjacent the chain 13 is a continuous race way 38 which is provided, at regular intervals throughout its length, with downwardly bent portions 39, short horizontal portions 40 in a plane beneath the major portion of the race way and upwardly inclined portions 41 connecting with the major or body portion of the race way.

Arranged for travel in the race way is a pair of rollers 42 carried by laterally projecting pins 43 which are secured to the bell-crank levers.

This arrangement of devices is provided for the disengagement of the bell-crank levers 36 and 37 from the eyes carried by the draw-bars 31 and 32 when crossing or traveling underneath the upper drive chain 12.

As shown in Fig. 8 of the drawing, when the truck 5 is at a point of crossing the bell-crank lever 36 is out of engagement with the draw-bar 31 and is passing underneath the chain 12. A continued movement of the truck and chain 12 will cause the bell-crank lever 36 to move upwardly and engage with the eye 35 formed in the draw-bar 31. As the truck and chain advance farther, the bell-crank lever 37 will be caused to disengage from the eye 35 formed in the draw-bar 32 and pass under the chain 12. Thus, it is obvious that at all times there is a positive connection between the lower drive chain 13 and the trucks 5. It is obvious further that as the bell-crank levers disengage from the eyes in the draw-bars their downward movement is in a direction opposed to the travel of the truck, thus they are released from the truck without restricting the movement of the truck relative to the chain.

The draw-bars 25 of the trucks 4 are not provided with directing shoes, such as 34, for the reason that the fingers 23 riding through the slots 6 normally aline the forward ends of the draw-bars with the slots.

The pivotal connection between the fingers 23 and the chain 12 permits the fingers to traverse the slots even though the chain may be slightly out of vertical alinement with the slot as might result in the slight movement of the bearing blocks 8.

In practical operation of the carousel, the motor 14 is set in motion and rotates the shaft 15, and, through the medium of the beveled gear wheels 17 and 18 motion is imparted to the central driving wheel 10ᵃ, thus the upper chain is driven and directed in a path parallel with the track way 2 by means of the idlers 10.

Arranged at regular intervals on the chain and spaced uniformly apart are the fingers which engage a number of the trucks 4. Simultaneously with the movement of the upper chain 12 the chain 13 is driven in a direction opposed to the travel of the chain 12. This lower chain 13 is driven through the medium of the beveled gear wheels 17 and 19 and rotates the wheel 11ᵃ which is in engagement with the chain 13 and at the side of the carousal opposed to the driving wheel 10ᵃ.

Carried by the chain 13 and arranged in pairs, which are spaced apart distances equal to the spacing of the fingers 23, are the bell-crank levers 36 and 37 which engage respectively with the eyes formed in the draw-bars 31 and 32 of the trucks 5.

For the purpose of withdrawing the bell-crank levers 36 and 37 out of engagement with the draw-bars of the trucks 5 and to pass underneath the upper chains, at points where the chains cross, the cams formed by the portions 39, 40 and 41 of the race way 38 are provided, which cams actuate the bell-crank levers 36 and 37, one at a time to pass underneath the upper drive chains.

It is obvious, as shown in Fig. 8 of the drawing, that one or the other of the bell-crank levers is in engagement with the truck 5 at the aforesaid points of crossing but normally, that is not at points of crossing, each of the bell-crank levers is in engagement with the draw-bars of the truck 5.

It is to be noted that all of the chain directing wheels 10 and 11 are of the same size and arranged in pairs on a common, vertically disposed shaft and that all of the wheels 10 and 11 except the central driving wheels 10ᵃ and 11ᵃ have smooth peripheries, that is are not provided with sprocket teeth, the chains being held in position upon the wheels by means of the projecting flanges of the links of the chains. Thus, it is possible that any one of the idlers may be temporarily checked in its rotation without effecting the travel of the chains.

By reason of the uniform drive of each of the chains and of the uniform spacing apart upon the chains of the means for engaging with the trucks to advance them with the chains, the trucks are propelled over the sinuous track ways crossing at frequent intervals without danger of collision.

If one of the truck-engaging devices should become broken it could be advanced by the next succeeding truck and the spacing of the trucks would permit of the advancing of the pair of trucks without danger of collision until the proper repair of truck-engaging device could be accomplished.

I am aware that heretofore carousels have been made employing sinuous track ways crossing at intervals and that trucks have been employed for travel upon the track ways and that there have been connections between the trucks and the drive chains which permitted the advancement of the trucks positively over said crossings; therefore I do not claim broadly this combination.

I claim:

1. The combination with endless track ways crossing each other at intervals, of trucks supported by the track ways and arranged for travel thereon, endless driving chains arranged in planes beneath the track ways and means carried by the chains for engagement with said trucks.

2. The combination with endless track ways crossing each other at intervals, of trucks supported by the track ways and arranged for travel thereon, endless driving chains arranged in planes beneath the track ways, means carried by the chains for engagement with the trucks and means arranged adjacent one of the chains for lowering the truck-engaging devices at times.

3. In a carousel continuous track ways crossing each other at intervals, trucks supported on the track ways, driving chains arranged one above the other and beneath the track ways, means for directing the chains to travel in courses parallel with the track ways, fingers carried by the upper chain for engagement with the trucks on one of the track ways, levers carried by the lower chain for engagement with the trucks supported on the other track way and a race way having cams for moving the levers out of engagement with the trucks to permit their passage under the upper drive chain at times.

4. In a carousel continuous, sinuous track ways crossing each other at intervals, drive chains arranged one above the other in a plane beneath the track ways, directing wheels arranged in pairs and of uniform diameters for directing the chains to travel in courses paralleling the track ways, means for imparting motion to a number of said wheels, trucks supported on the track ways, fingers carried by the upper drive chain for engagement with a number of the trucks, bell-crank levers carried by the lower chain for engagement with trucks supported on the other track way and means for engaging said bell-crank levers at times to cause them to disengage from said trucks and travel in a plane beneath the upper drive chain.

5. In a carousel, a pair of continuous, tortuous track ways arranged to cross each other at intervals, there being a slot formed between each pair of tracks and parallel therewith, trucks supported on each of the track ways, wheels arranged in pairs one above the other beneath said track ways, chains embracing the wheels and disposed to travel in courses immediately under and parallel with said slots, means carried by the upper chain for engagement with the trucks on one of the track ways, means carried by the lower chain for engagement with the trucks on the other track way and means arranged adjacent the lower drive chain and parallel therewith for lowering the last mentioned truck-engaging means to permit them to pass under the upper drive chains at points of crossing.

6. In a carousel, a platform, continuous, sinuous track ways supported by said platform, there being continuous slots formed in the platform paralleling each of the track ways, trucks supported on each of the track ways, drive chains located beneath the platform and supported in different horizontal planes, wheels embraced by the chains for directing the chains to travel in courses parallel and immediately under said slots, means for imparting motions of uniform speed to the drive chains, means carried by the upper chain and traversing one of the slots for advancing the trucks on one of the track ways, means carried by the lower chain for engagement with the trucks on the other track way for advancing said trucks, a race way adjacent the lower drive chain, cams formed at intervals in the race way and means traversing said race way in engagement with the last mentioned truck-engaging means for lowering them to permit them to pass under the upper drive chain at times.

7. In a carousel, a pair of continuous, sinuous track ways, a pair of oppositely driven chains arranged one above the other beneath and parallel with said track ways, chain directing wheels arranged in pairs embraced by said chains, a motor for imparting uniform speeds to the chains, trucks supported on the track ways, a number of which have single draw-bars, means carried by the upper chain for engaging with said draw-bars, the remaining trucks provided each with a forwardly and rearwardly projecting draw-bar, devices arranged in pairs carried by the lower chain for engaging the pairs of draw-bars and means for raising and lowering the draw-bar engaging-devices carried by the lower chain to permit their passage underneath the upper drive chain at points of crossing.

In testimony whereof, I have signed my name to this specification, in presence of two subscribing witnesses.

AFTON G. REYNOLDS.

Witnesses:
E. E. LONGAN,
E. L. WALLACE.